United States Patent [19]
Von Holdt

[11] Patent Number: 6,106,265
[45] Date of Patent: Aug. 22, 2000

[54] STACK MOLD CENTERING SYSTEM

[76] Inventor: John W. Von Holdt, 6864 Lexington La., Niles, Ill. 60648

[21] Appl. No.: 09/112,617

[22] Filed: Jul. 9, 1998

[51] Int. Cl.[7] .............................. B29C 45/66; B29C 45/84
[52] U.S. Cl. ...................... 425/151; 425/338; 425/451.7; 425/588; 425/589
[58] Field of Search .................................... 425/151, 338, 425/450.1, 451.7, 588, 589, DIG. 45

[56] References Cited

U.S. PATENT DOCUMENTS

| | | | |
|---|---|---|---|
| 3,669,599 | 6/1972 | Snider et al. | 425/451.7 |
| 3,857,440 | 12/1974 | Ruegg | 425/451.9 |
| 3,905,741 | 9/1975 | Poncet | 425/451.7 |
| 3,986,805 | 10/1976 | Haines | 425/450.1 |
| 4,408,981 | 10/1983 | Brown | 425/589 |
| 4,718,845 | 1/1988 | Sheffield et al. | 425/589 |
| 5,578,333 | 11/1996 | Schad et al. | 425/588 |

OTHER PUBLICATIONS

Bulletin dated Jun., 1996 entitled: "National . . . The New Work Standard Runnerless Stack Mold Base". Sold by the Plas–Tool Co. of Niles, Illinois (4 pages).

Portion of p. 71 of an unknown magazine comprising an advertisement entitled: "Enhance Productivity . . . Over 20 million continuous cycles and still going strong!" (undated).

One sheet portion of an unknown publication, probably a catalog of the HASCO Company of Germany, date unknown.

*Primary Examiner*—James P. Mackey
*Attorney, Agent, or Firm*—Gerstman, Ellis & McMillin, Ltd.

[57] ABSTRACT

A molding apparatus comprises a first mold plate positioned between a pair of second mold plates for opening and closing pairs of mold halves. The mold plates carry leader pins which are connected with each other in both the open and the closed position of the molding apparatus, for lateral support of the central first mold plate. Also or alternatively, a mold plate centering system is provided, comprising threaded rods carried by the first, central mold plate and pointing toward the second plates. Internally threaded sleeves are carried by the second plates, with at least a portion of each threaded rod occupying at least a portion of the bore of the internally threaded sleeve and screw threaded relation. Specifically, the threaded rods are joined together and freely rotatable, with the result that the position of the first, central plate is controlled as the respective plates are opened and closed by a moving platen of an injection mold. By this invention, a second sleeve prevents exposure of the threaded rods, to avoid accident and jamming of the system with debris.

19 Claims, 5 Drawing Sheets

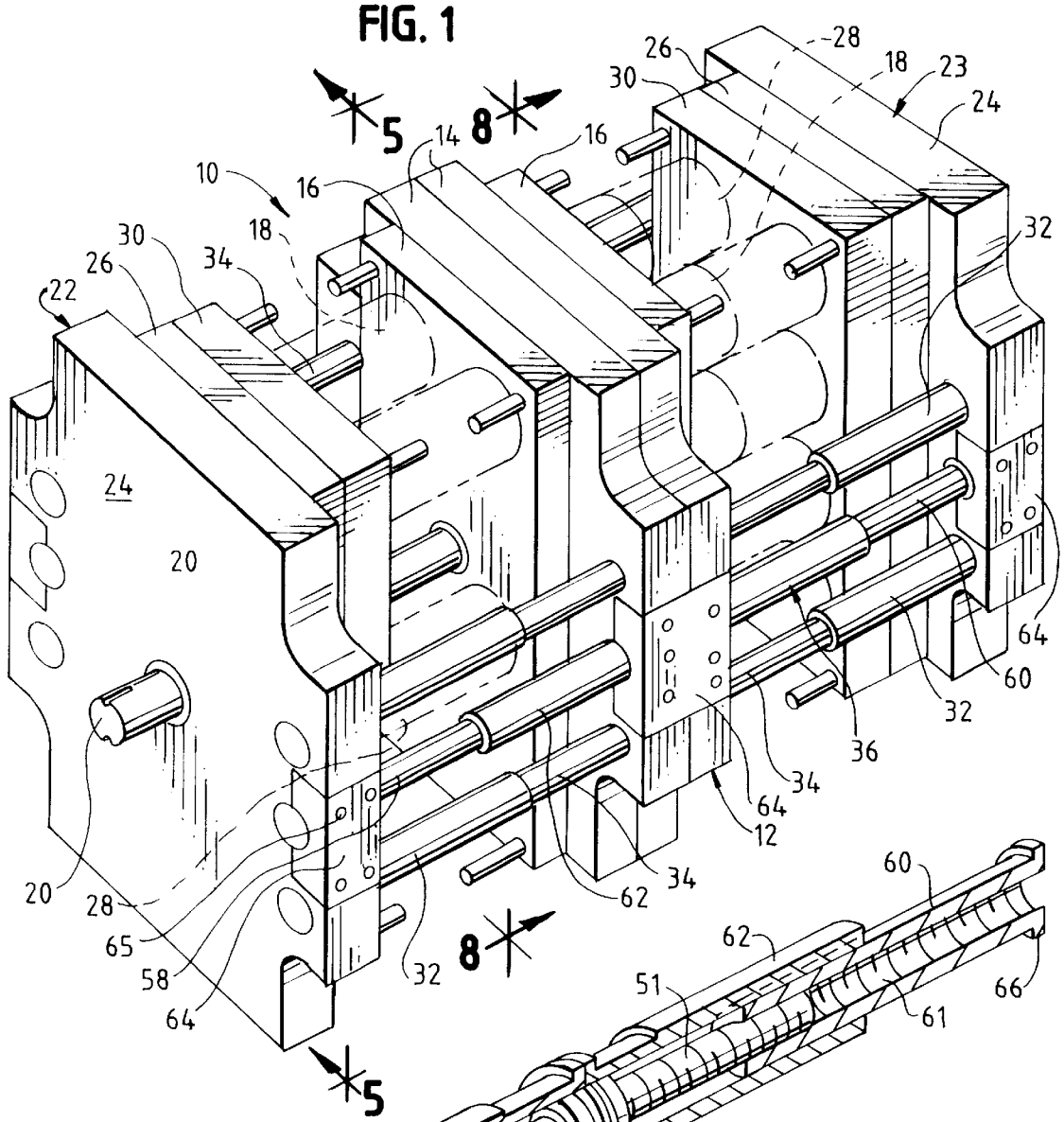
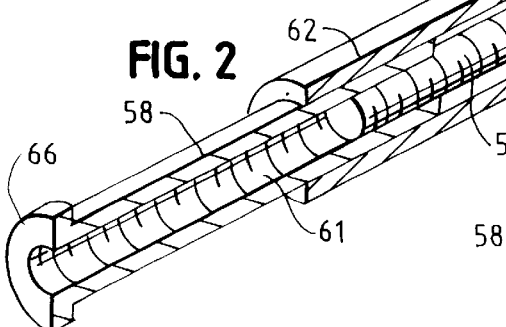
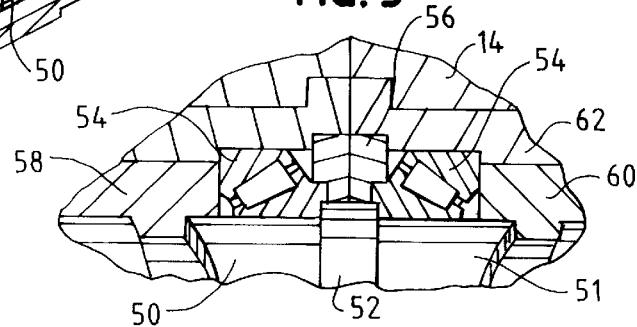

STACK MOLD CENTERING SYSTEM

BACKGROUND OF THE INVENTION

Stack molds are used for high volume production, in which rows of mold cores and mold cavities are stacked in a single machine. In conventional stack molds, a central, first mold plate is provided, typically for holding the mold cavities of the respective stacks of molds. Typically, the central plate comprises two or more abutting plates, and connects with cooling lines and the like.

Two outer, second mold plates typically hold the respective mold cores, with the entire system opening and closing during the molding process. One of the outer, second mold plates is typically affixed to a stationary platen of a conventional molding machine, while the other outer mold plate is attached to the moveable platen, so that one of the outer, second mold plates and the central first mold plate move in the opening and closing process of molding.

In prior art systems, leader pins are provided which interengage between the mold plates, to laterally align them while the stack mold is in the closed, molding position, but are separated in the open position. Also, in conventional stack molds, an external rack and pinion system is provided to keep the central, first mold plate properly spaced between the outer, second mold plates at all times.

In an improvement on the conventional stack molds, the M-U-M-S modular unit mold system base is made by the Plas-Tool Company of Niles, Illinois. The "hot runner plate", which is the first, central mold plate, has outrigger supports that rests on tiebars to support its weight, the movement of the mold being horizontal.

Unfortunately, the exposed rack-and-pinion system, and other external moving parts, have created a risk for accident and injury among mold operators. Also, debris such as plastic fragments can jam into exposed threads of a rack and pinion system or the like, disabling the molding machine. There is a need for a reliable mold system in which parts such as a rack and pinion or other threaded systems are not exposed, reducing the risk for accidental entanglement with the user or for jamming of the threaded system.

Another system for spacing the central first plate (also called the floating hot runner assembly) comprises a threaded rod carried by one plate, which engages a threaded sleeve carried by another plate, this being manufactured by the Hasco Company of Germany. These are attached to the peripheries of the respective mold plates, and serve to keep the first, central mold plate centered. However, the moving threads of the rods also represent the potential for a serious accident, if clothing of a user of the mold becomes entangled in the rotating rod during mold operation. They also may become jammed with debris.

By this invention, a mold, and preferably a stack mold, is provided, having an increase in efficiency and safety of operation, with the spacing and support structures being more protected so that there is a great decrease in the likelihood of entanglement of a user's clothing, resulting in serious injury to the mold operator or other bystander as the mold closes. Also, the chances for jamming of the mold with debris are reduced.

DESCRIPTION OF THE INVENTION

In accordance with this invention, a molding apparatus is provided which comprises at least first and second moveable mold plates for carrying, opening and closing at least one pair of mold halves. The mold plates typically comprise a first mold plate positioned between a pair of second mold plates, with the mold plates all having leader pins in which leader pins of the first mold plate engage leader pins of the respective second mold plates in a laterally supporting relation. Also, the mold plates have a path of movement between a first position for carrying a mold halves in an open position and a second position for carrying the mold halves in a closed position.

By this invention, the leader pins of the first mold plate engage the leader pins of the respective second mold plates in the desired laterally supporting relation throughout the entire path of movement and in the first and second positions. Thus, the first, central mold plate is supported without the need for outriggers resting on tiebars or the like.

Preferably, the engaging leader pins are in telescoping relation with each other.

As an added inventive feature, which is used with the above feature or independently on its own, the first mold plate connects with the second mold plate or mold plates by a mold plate centering system. The centering system comprises: threaded rods carried by one of the first and second plates, which rods are pointing toward the other of the first and second plates. Internally threaded sleeves are carried by the other of the first and second plates, with at least a portion of each threaded rod occupying at least a portion of a bore of one of the internally threaded sleeves in screw-threaded relation, so that each second mold plate is connected with the first mold plate by such a rod and sleeve throughout the path of movement of the mold plates and in the first and second positions. One of the rod and sleeve, typically the rod, is axially rotatable. Thus, the first mold plate can be centered along the axis of movement by the system as the mold plates are moved between the first and second positions.

By this invention, second sleeves are provided, being positioned to enclose the threaded rod and typically also the threaded sleeve, to cover particularly the threaded rods in substantially all positions of the plates along the path of movement. Thus, the rotating threads are not exposed to the exterior, which reduces the risk of accident, and also jamming by entanglement with debris such as fragments of plastic, rags, or the like.

Preferably, the threaded rods are carried on the first, central mold plate in a manner permitting rotation of the threaded rods about their axes as the plates are moved in the path of movement. A pair of such threaded rods may respectively engage threaded sleeves of the two second mold plates. The threaded rods of the pair may be rigidly and coaxially joined together at respective threaded rod ends at the first mold plate, being carried at the first mold plate typically in a bearing in freely rotatable relation with the first plate. The threaded rods each have helical threads of opposite sense. The threaded rods thus may rotate as one unit as the molding apparatus is moved between the first and second positions by action of the platens of a molding machine. The effect of this is to equalize the distances of each second mold plate from the first mold plate in every position of the apparatus.

Preferably, the threaded rods and sleeves are positioned in bores which are located inside of the peripheries of the first and second mold plates, thus being recessed and spaced from the sides of the mold. The mold plates each define a removable insert to facilitate installation of such rods and sleeves in each of the first and second mold plates.

Thus, a mold centering system comprising a threaded rod and sleeve provides centering of particularly the first, central mold plate in the longitudinal direction of mold opening and closing. The leader pins provide transverse centering of the first, central mold plate throughout the entire range of movement of the mold. This is accomplished with increased safety, without exposure of gear teeth and other outwardly projecting parts that might grab clothing or jam with debris as the mold plates open and close.

DESCRIPTION OF THE DRAWINGS

FIG. 1 is a perspective view of a stack mold, made in accordance with this invention;

FIG. 2 is a fragmentary, perspective view, with portions broken away, of the interacting mold plate centering system comprising threaded rods interacting with internally threaded sleeves;

FIG. 3 is an enlarged, fragmentary view of a central portion of the mold plate centering system of FIG. 2.

DESCRIPTION OF SPECIFIC EMBODIMENTS

Figure 4:
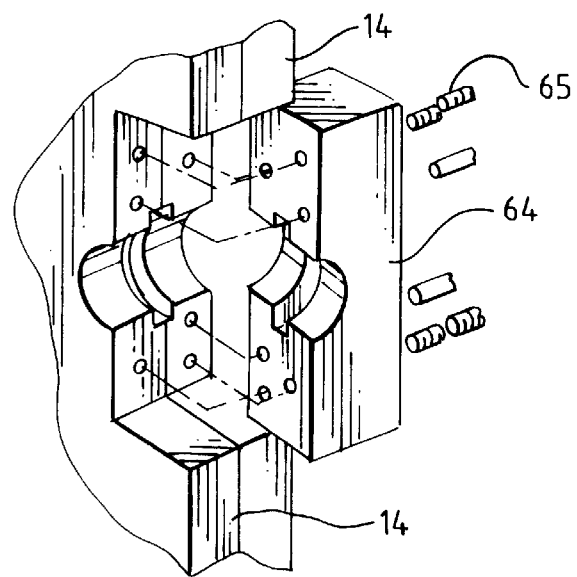
FIG. 4 is a fragmentary, perspective view of a central portion of the first mold plate of FIG. 1.

Referring to the drawings, a multiple cavity stack mold 10 is shown, having a first mold plate 12, which comprises a pair of central hot manifold plates 14 which abut each other, bracketed between a pair of mold cavity retainer plates 16, to which the many separate mold cavities 18 can be secured. A connection with molding compound is provided by a mold sprue line 20. Sprue line 20 connects with conventional channels that pass between the hot manifold plates 14 and into communication with the respective mold cavities 18.

A pair of second mold plates 22, 23 are provided with first mold plate 12 positioned between them. The second mold plates 22, 23 may each comprise a clamp plate 24, which may be clamped to a platen of a molding machine, and a core retainer plate 26, to which the respective mold cores 28 are attached. A stripper plate 30 may be optionally carried by each second mold plate to assist in removal of the molded products from the mold cores 28. Such stripper plates 28 are of conventional design, being typically operated by hydraulic rods (not shown) extending through the respective second mold plates 22, 23.

The respective mold plates 12, 22, 23 each carry sets of leader pins. Leader pins 32 are carried by each second mold plate 22, 23 at opposed sides of first mold plate 12, being positioned for telescoping engagement with another set of leader pins 34, which are carried by first mold plate 12, with some of the pins 34 extending toward one of the second plates 22, and other of the pins 34 extending in the other direction toward the other second plate 23, to engage its leader pins 32.

Figure 5:
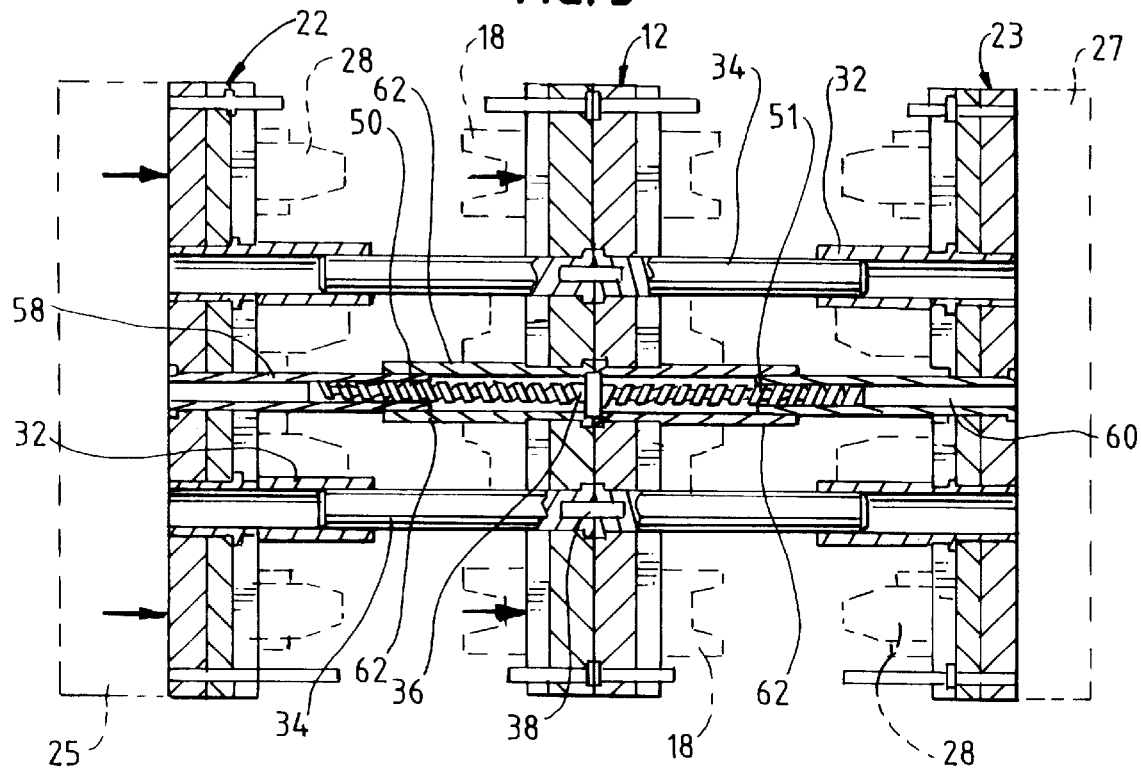
FIG. 5 is a longitudinal sectional view of the molding apparatus taken along line 5—5 of FIG. 1, shown in its first, open position.
Figure 6:
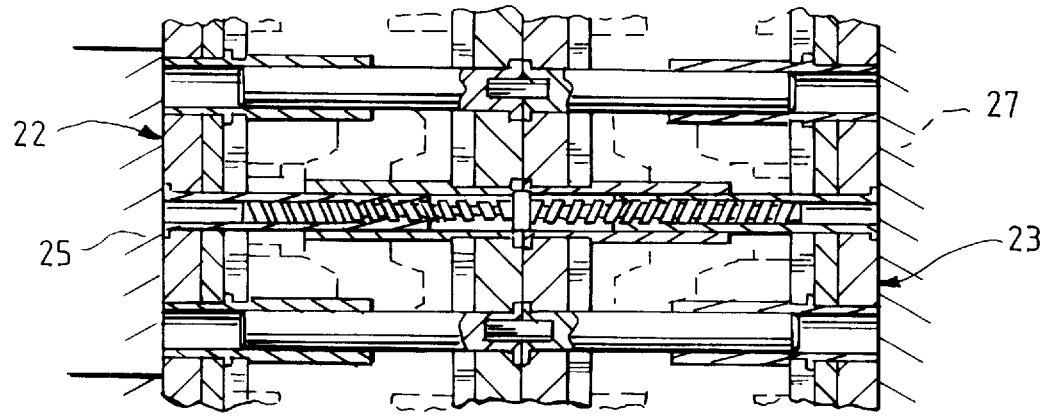
FIG. 6 is a fragmentary, longitudinal sectional view similar to FIG. 5, but showing the molding apparatus in an half-closed position.
Figure 7:
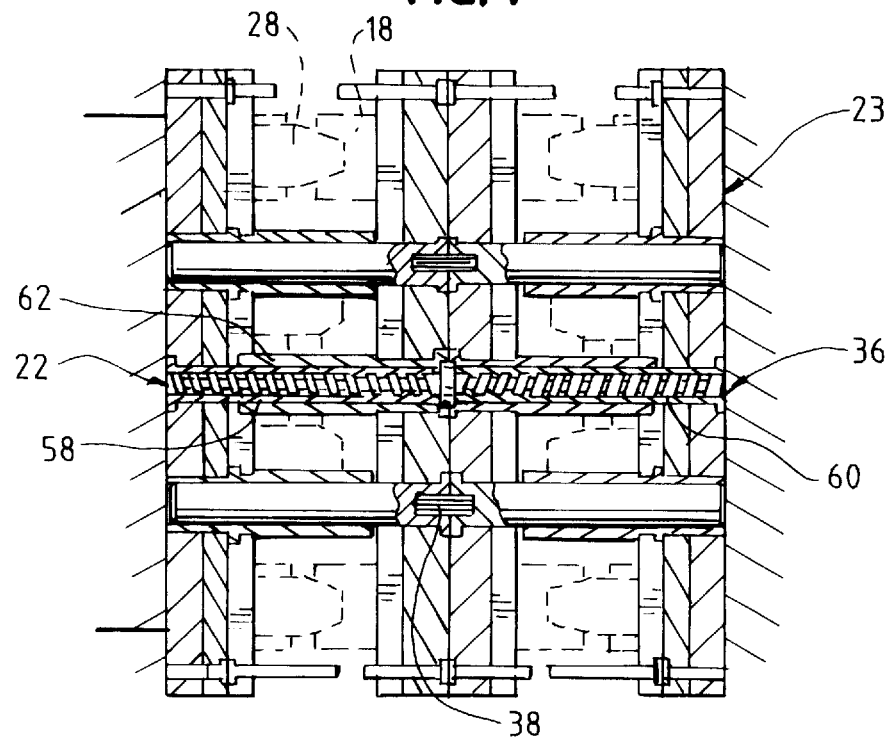
FIG. 7 is a sectional view similar to FIG. 5, but showing the apparatus in its second, closed position.

The molding apparatus 10 is moveable along a path of movement between a first position for carrying the respective mold halves 18, 28 in an open position, as shown in FIG. 5, and a second position for carrying the respective mold halves 18, 28 in a closed position for molding, as shown in FIG. 7. This is typically accomplished with each of the second mold plates 22, 23 being carried on conventional platen 25, 27 (FIG. 5) of a molding machine, which platens move back and forth, causing second plate 22 to move while second plate 23 remains stationary, as shown by comparison between the various FIGS. 5, 6 and 7. Correspondingly, the central, first plate 12 moves half the distance of second plate 22, being controlled by mold plate centering system 36.

In accordance with this invention, the telescoping leader pins 32, 34 engage each other in a laterally supporting relation throughout the entire path of movement (as represented by the path of movement between the configurations of FIGS. 5 and 7) and in the first position of FIG. 5 and the second position of FIG. 7. Thus, the central, first plate 12 is carried between the second plates 22, 23 by the telescoping, engaging leader pins 32, 34 at all positions of operation, eliminating the need for the outrigger supports that rest on tiebars as in the previously discussed prior art design. Also, the telescoping leader pins 32, 34 are quite safe as they move with the opening and closing mold, being very unlikely to cause accident to a bystander and very unlikely to jam by encountering debris.

The individual, inner leader pins 34 may be joined together by a pin 38 at the center of first, cavity holding plate 12, as shown, to provide added lateral strength to the support of first plate 12 between the respective second plates 22, 23. Leader pins 34 define enlarged flanges 40 (FIG. 8), which fit into a mating recess of each plate 14 for firm retention as the leader pins 34 slide freely in telescoping relation within leader pins 32. In the prior art, corresponding leader pins 32, 34 are separate from each other when the mold is opened, with lateral support for first plate 12 being provided by other means, which means can be eliminated by this invention.

Figure 8:
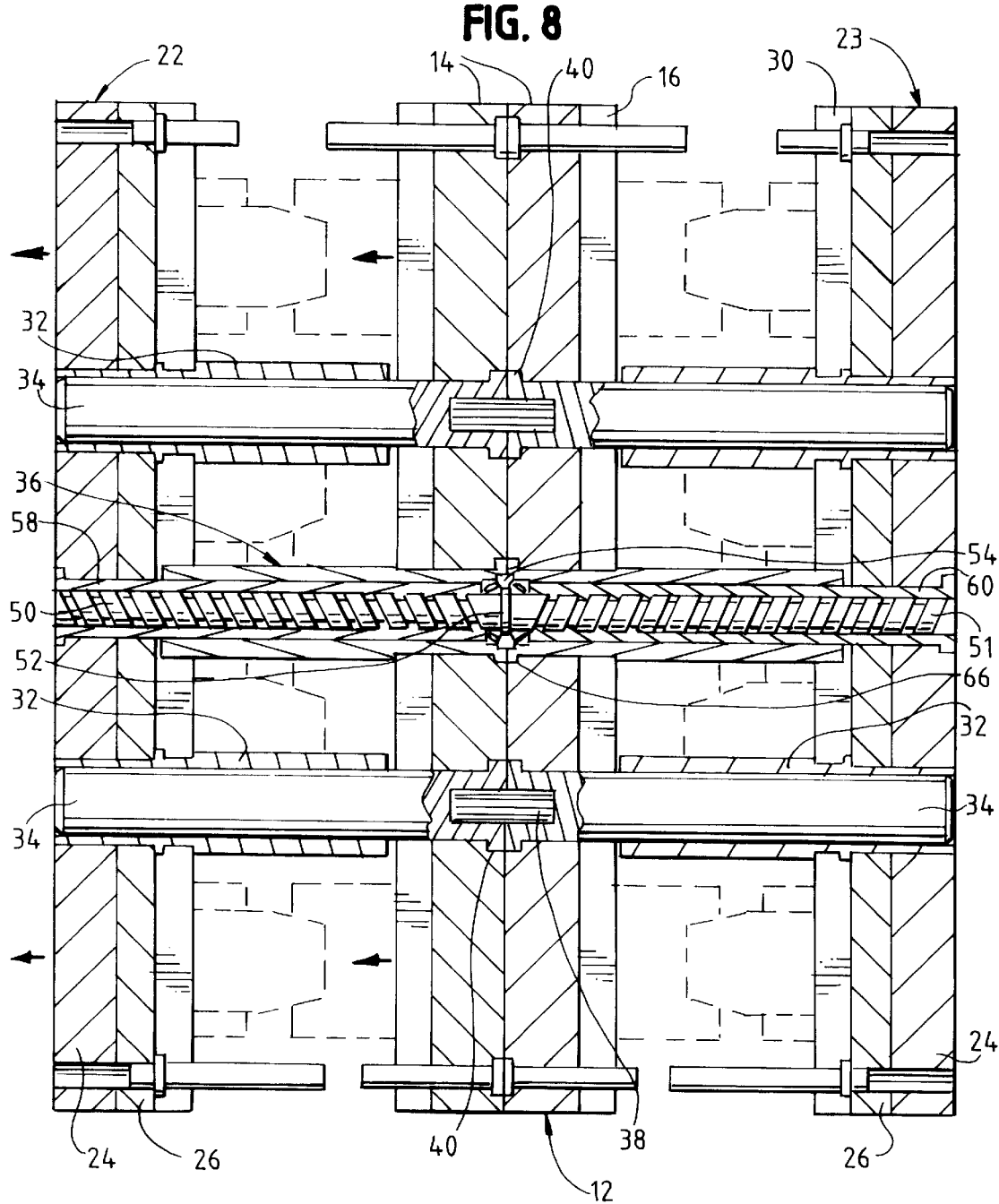
FIG. 8 is an enlarged, sectional view of FIG. 7, shown as the stack mold starts to reopen.
Figure 9:
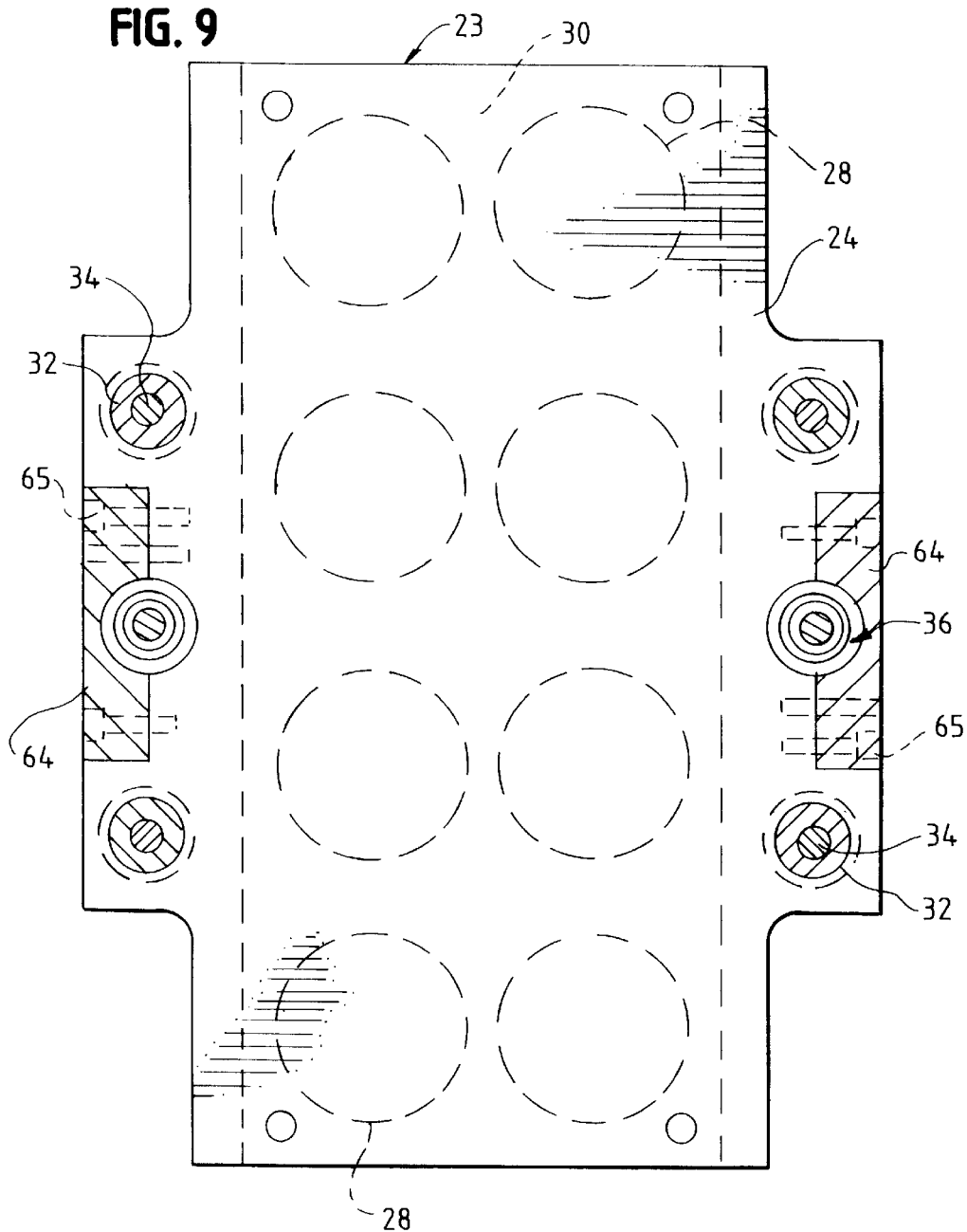
FIG. 9 is a sectional view taken along line 9—9 of FIG. 1.

Mold plate centering system 36 comprises pairs of threaded rods 50, 51 extending oppositely and outwardly from first plate 12 toward the respective second plates 22, 23, as particularly shown in FIGS. 5 and 8. The respective threaded rods 50, 51 may in this embodiment be integrally connected at their central ends 52 where they are retained in rotatable relation to the mold by thrust bearing 54, as particularly shown in FIG. 3. The respective pair of rods 50, 51 may be integrally formed as a single piece. A flange at end 52 can fit within thrust bearing 54 for retention of the integral rods 50, 51. Split ring spacers 56 can also be provided. The rods 50, 51 can freely rotate relative to mold 10, while they remain rigidly oriented with respect to each other, being preferably made of a single piece of metal. Furthermore, the threads of the respective threaded rods 50, 51 are of opposite rotational sense to each other, one extending clockwise and the other counterclockwise.

A mold plate centering system 36 is typically placed on each side of mold 10 in the position as shown in FIG. 1.

Each of the second plates 22, 23 carries an internally threaded sleeve 58, 60 (FIG. 8) as part of each mold plate centering system 36, with each threaded rod 50, 51 occupying at least a portion of bore 61 (FIG. 2) of each threaded rod 58, 60 in screw-threaded relationship. Thus, as the respective plates 12, 22 are moved by the moveable mold platen 25 of the molding machine to which mold system 10 is attached, threaded shafts 50, 51 spontaneously rotate, driven by the screw threads of sleeves 58, 60, and the degree of movement of both plates 12 and 22 is firmly limited by the number of rotations of the joined, threaded shafts 50, 51. Thus, the position of first plate 12 relative to second plates 22, 23 is strictly controlled and constrained, typically to be exactly equidistant between the respective two first plates at all times along the path of motion and in all positions.

In accordance with this invention, second sleeves 62 are provided, being carried by first, central plate 12. Second sleeves 62 are positioned to be able to enclose both threaded rods 50, 51 and threaded sleeves 58, 60, and further positioned and proportioned to cover threaded rods 50, 51 in substantially all positions of the plates 12, 22, 23 along the path of movement. This is particularly illustrated by FIGS. 5 and 7, in which threaded sleeves 58, 60 and second sleeves 62 can be together seen to be substantially covering or enclosing threaded rods 50, 51 so that no portion of the threaded rods that projects outside of threaded sleeves 58, 60 is exposed to the exterior, even in the mold-open first position as illustrated in FIG. 5. Thus the threaded rods remain covered in substantially all positions of the plates along the path of movement. This not only protects bystanders from being accidentally entangled somehow with the threads of the rods, but it also prevents the jamming of the rotational relationship of rods 50, 51 and threaded sleeves 58, 60, since the arrangement of this invention prevents debris such as fragments of plastic, a rag, or something else from jamming between the interengaging threads of rods 50, 51 and threaded sleeves 58, 60. Such jamming action can disable the molding apparatus 10 until it is cleared out, so that the above described invention can greatly reduce down time in the molding operations.

Mold plate centering system 36 can be positioned in bores which are within the respective peripheries of mold plates 14, 22, 23 as shown particularly in FIG. 1. The assembly of this is facilitated by providing removable inserts 64 in each of the respective plates 14, 22, 23 so that the centering systems 36 on each side of mold 10 may be laterally inserted for assembly of the molding system. The leader pins 32, 34 are more easily inserted without the need for such a lateral insertion. The respective insert 64 may then be bolted into place with bolts 65 to hold the mold centering system 36 in the desired position.

Second sleeves 62 may carry end flanges 66 that may abut each other, and may be tightly retained together by recesses formed in plates 14, as shown in FIG. 8.

Thus, as the platens 25, 27 of a molding machine move the respective plates 22 and 12 back and forth to achieve the first mold-open position and the second mold-closed position, threaded rods 50, 51 are spontaneously caused to rotate because of their screw threaded relationship with sleeves 58, 60. Nevertheless, by this invention, the threaded rods are never exposed to the exterior, while they precisely control the spacing of first plate 12 relative to second plates 22, 23 in all positions of the system. Also, the leader pins 32, 34 continuously engage each other to provide lateral support to first plate 12, which may be otherwise unsupported, eliminating the need for outriggers or the like and the potential danger and inconvenience that they represent.

Figure 10:
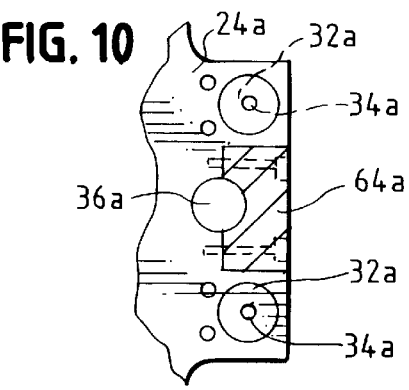
FIG. 10 is a reduced-size, fragmentary view of an alternative embodiment to that of FIG. 9.

FIG. 10 shows a modification of molding apparatus 10 with reference numerals that carry the suffix a, and identify corresponding parts of the same number found in the embodiment of FIGS. 1–7.

The above has been offered for illustrative purposes only, and is not intended to limit the scope of the invention of this application, which is as defined in the claims below.

That which is claimed:

1. A molding apparatus which comprises: a first mold plate positioned between a pair of second mold plates, for carrying opening and closing pairs of mold halves, said mold plates each carrying a plurality of leader pins, the leader pins of the first mold plate extending toward leader pins of the respective second mold plates, said mold plates having a path of movement between a first position for carrying the respective mold halves in an open position and a second position for carrying the mold halves in a closed position, the leader pins of said first mold plate engaging leader pins of the respective second mold plates in laterally supporting relation throughout the path of movement and in said first and second positions, said first mold plate connecting with each of said second mold plates by a mold plate centering system, which centering system comprises: threaded rods carried by one of said first and second plates and pointing toward the other of said first and second plates; internally threaded sleeves carried by the other of said first and second plates, at least a portion of each threaded rod occupying at least a portion of a bore of a said internally threaded sleeve in screw-threaded relation so that each second mold plate is connected with the first mold plate by a said rod and sleeve in said screw threaded relation throughout said path of movement and in said first and second positions, one of said rod and sleeve being axially rotatable whereby said first mold plate is centered by said system as the mold plates are moved between the first and second positions; and second sleeves positioned to enclose both said threaded rod and threaded sleeve, to cover the threaded rods in substantially all positions of the plates along said path of movement.

2. The apparatus of claim 1 in which said engaging leader pins are in telescoping relation with each other.

3. The apparatus of claim 1 in which said engaging leader pins are in telescoping relation with each other.

4. The apparatus of claim 1 in which said threaded rods are carried on opposed sides of said first mold plate.

5. The apparatus of claim 4 in which said threaded rods are carried by said first mold plate in a manner permitting rotation of said rods about their axes as the plates are moved in said path of movement.

6. The apparatus of claim 5 in which said engaging leader pins are in telescoping relation with each other.

7. The apparatus of claim 4 in which a pair of said threaded rods respectively engage threaded sleeves of the two second mold plates, the threaded rods of said pair being rigidly and coaxially joined together at respective threaded rod ends at said first mold plate and carried at said first plate in freely rotatable relation with said first plate, said threaded rods each having helical threads of opposite sense, whereby said threaded rods rotate as one unit as said molding apparatus is moved between said first and second positions to equalize the distances of each second mold plate from the first mold plate in every position of said apparatus.

8. The apparatus of claim 7 in which said threaded rods and sleeves are positioned in bores within the peripheries of said first and second mold plates, said mold plates each defining a removable insert to facilitate installation of said rods and sleeves.

9. The apparatus of claim 1 in which said threaded rods and sleeves are positioned in bores within the peripheries of said first and second mold plates, said mold plates each defining a removable insert to facilitate installation of said rods and sleeves.

10. A molding apparatus which comprises: a first mold plate; a pair of moveable second mold plates positioned adjacent to opposed sides of the first mold plate, said plates being for carrying, opening, and closing at least two pairs of mold halves, one of each said pair of mold halves being carried on a side of the first mold plate and the other of each said pair being carried on one of said second mold plates, said mold plates having a path of movement between a first position for carrying the mold halves in an open position and a second position for carrying the mold halves in a closed position, said first mold plate connecting with each of said second mold plates by a mold plate centering system, which centering system comprises: threaded rods carried by one of said first and second plates and pointing toward the other of said first and second plates; internally threaded sleeves carried by the other of said first and second plates, at least a portion of each threaded rod occupying at least a portion of a bore of a said internally threaded sleeve in screw-threaded relation so that each second mold plate is connected with the first mold plate by a said rod and sleeve in said screw threaded relation throughout said path of movement and in said first and second positions, one of said rod and sleeve being axially rotatable, whereby said first mold plate is centered by said system as the mold plates are moved between the first and second positions; and second sleeves positioned to enclose both said threaded rods and threaded sleeves which are engaging each other, to cover the threaded rods in substantially all positions of the plates along said path of movement.

11. The apparatus of claim 10 in which said threaded rods are carried on opposed sides of said first mold plate.

12. The apparatus of claim 11 in which a pair of said threaded rods respectively engage threaded sleeves of the two second mold plates, the threaded rods of said pair being rigidly and coaxially joined together at respective threaded rod ends at said first mold plate and carried at said first plate in freely rotatable relation with said first plate, said threaded rods each having helical threads of opposite sense, whereby said threaded rods rotate as one unit as said molding apparatus is moved between said first and second positions to equalize the distances of each second mold plate from the first mold plate in every position of said apparatus.

13. The apparatus of claim 12 in which said threaded rods and sleeves are positioned in bores within the peripheries of said first and second mold plates, said mold plates each defining a removable insert to facilitate installation of said rods and sleeves.

14. The apparatus of claim 10 in which said threaded rods and sleeves are positioned in bores within the peripheries of said first and second mold plates, said mold plates each defining a removable insert to facilitate installation of said rods and sleeves.

15. The apparatus of claim 11 in which said threaded rods are carried by said first mold plate in a manner permitting rotation of said rods about their axes as the second plates are moved in said path of movement.

16. The apparatus of claim 15 in which only a portion of said internally threaded sleeves carry internal threads.

17. A molding apparatus which comprises: a first mold plate, a second mold plate, said plates being for carrying, opening, and closing pairs of mold halves, one of each said pair of mold halves being carried on a side of the first mold plate and the other of said pair of mold halves being carried on the second mold plate, said mold plates having a path of movement between a first position for carrying the mold halves in an open position and a second position for carrying the mold halves in a closed position, the first mold plate connecting with the second mold plate by a mold plate spacing system, which spacing system comprises: a threaded rod carried by one of the first and second plates and pointing toward the other of said first and second plates; an internally threaded sleeve carried by the other of said first and second plates, at least a portion of said threaded rod occupying at least a portion of the bore of said internally threaded sleeve in screw-threaded relation so that said second mold plate is connected with the first mold plate by said rod and sleeve in said screw threaded relation throughout said path of movement and in the first and second positions, one of said rod and sleeve being axially rotatable, whereby said mold plates are spaced by said system as the mold plates are moved between the first and second positions; and a second sleeve positioned to enclose both said threaded rod and the threaded sleeve which are engaging each other, to cover the threaded rod in substantially all positions of the plates along said path of movement.

18. The apparatus of claim 17 in which said threaded rods is carried by said first mold plate in a manner permitting rotation of said rod about its axis as the second plate is moved in said path of movement.

19. The apparatus of claim 17 in which only a portion of said internally threaded sleeve carries internal threads.

* * * * *